US012647607B2

(12) United States Patent
Samuelsson et al.

(10) Patent No.: US 12,647,607 B2
(45) Date of Patent: \*Jun. 2, 2026

(54) DECODER AND ENCODER AND METHODS FOR CODING OF A VIDEO SEQUENCE

(71) Applicant: Telefonaktiebolaget L M Ericsson (publ), Stockholm (SE)

(72) Inventors: Jonatan Samuelsson, Stockholm (SE); Rickard Sjöberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 11 days.

This patent is subject to a terminal disclaimer.

(21) Appl. No.: 18/766,006

(22) Filed: Jul. 8, 2024

(65) Prior Publication Data

US 2024/0364922 A1      Oct. 31, 2024

Related U.S. Application Data

(63) Continuation of application No. 18/239,354, filed on Aug. 29, 2023, now Pat. No. 12,069,298, which is a
(Continued)

(51) Int. Cl.
H04N 19/58 (2014.01)
H04N 19/105 (2014.01)
(Continued)

(52) U.S. Cl.
CPC ........... H04N 19/58 (2014.11); H04N 19/105 (2014.11); H04N 19/174 (2014.11);
(Continued)

(58) Field of Classification Search
CPC .... H04N 19/58; H04N 19/105; H04N 19/174; H04N 19/176; H04N 19/184;
(Continued)

(56) References Cited

U.S. PATENT DOCUMENTS

| | | | | |
|---|---|---|---|---|
| 2003/0108099 A1* | 6/2003 | Nagumo | .................. | G06T 9/20 |
| | | | | 375/E7.199 |
| 2005/0008240 A1* | 1/2005 | Banerji | ................ | H04N 19/895 |
| | | | | 375/E7.262 |

(Continued)

FOREIGN PATENT DOCUMENTS

WO        2013/158024 A1     10/2013

OTHER PUBLICATIONS

International Search Report for International Application No. PCT/EP2013/077229 mailed Mar. 25, 2014, 4 pages.
(Continued)

*Primary Examiner* — Joseph Suh
(74) *Attorney, Agent, or Firm* — Sage Patent Group

(57) ABSTRACT

An encoder calculates an indication to a previous reference picture having temporal identity of zero. The encoder creates a first set of indicators to the previous reference picture, to all reference pictures in a first reference picture set of the previous reference picture, and to all pictures following the previous reference picture in decoding order and precede the current picture in decoding order. The encoder sets a flag for picture order count cycle, when a long term reference picture (LTRP) has least significant bits (LSBs) of a picture order count, for which more than one picture in the first set share same value of the LSBs of picture order count as the LTRP. The decoder obtains LSB of a picture order count for a LTRP in a reference picture set of the current picture. The decoder concludes non-compliant bitstream based on indications provided by the flag.

16 Claims, 6 Drawing Sheets

Related U.S. Application Data continuation of application No. 17/667,627, filed on Feb. 9, 2022, now Pat. No. 11,818,392, which is a continuation of application No. 17/221,333, filed on Apr. 2, 2021, now Pat. No. 11,284,106, which is a continuation of application No. 16/589,505, filed on Oct. 1, 2019, now Pat. No. 10,999,600, which is a continuation of application No. 15/984,573, filed on May 21, 2018, now Pat. No. 10,477,239, which is a continuation of application No. 15/014,543, filed on Feb. 3, 2016, now Pat. No. 9,998,758, which is a continuation of application No. 14/420,408, filed as application No. PCT/EP2013/077229 on Dec. 18, 2013, now Pat. No. 9,300,965.

(60) Provisional application No. 61/753,158, filed on Jan. 16, 2013.

(51) Int. Cl.

| | |
|---|---|
| *H04N 19/169* | (2014.01) |
| *H04N 19/174* | (2014.01) |
| *H04N 19/176* | (2014.01) |
| *H04N 19/184* | (2014.01) |
| *H04N 19/423* | (2014.01) |
| *H04N 19/44* | (2014.01) |
| *H04N 19/463* | (2014.01) |
| *H04N 19/503* | (2014.01) |
| *H04N 19/70* | (2014.01) |

(52) U.S. Cl.
CPC ......... *H04N 19/176* (2014.11); *H04N 19/184* (2014.11); *H04N 19/188* (2014.11); *H04N 19/423* (2014.11); *H04N 19/44* (2014.11); *H04N 19/463* (2014.11); *H04N 19/503* (2014.11); *H04N 19/70* (2014.11)

(58) Field of Classification Search
CPC .... H04N 19/188; H04N 19/423; H04N 19/44; H04N 19/463; H04N 19/503; H04N 19/70
See application file for complete search history.

(56) References Cited

U.S. PATENT DOCUMENTS

| | | | | |
|---|---|---|---|---|
| 2006/0013318 A1* | 1/2006 | Webb | ..................... | H04N 19/91 |
| | | | | 375/E7.279 |
| 2008/0117985 A1* | 5/2008 | Chen | ...................... | H04N 19/46 |
| | | | | 375/E7.2 |
| 2009/0002379 A1* | 1/2009 | Baeza | .................... | H04N 19/42 |
| | | | | 345/522 |
| 2013/0077687 A1* | 3/2013 | Wang | ..................... | H04N 19/70 |
| | | | | 375/E7.243 |
| 2013/0089152 A1* | 4/2013 | Wang | ................... | H04N 19/187 |
| | | | | 375/240.23 |
| 2013/0094774 A1* | 4/2013 | Misra | ..................... | H04N 19/58 |
| | | | | 382/233 |
| 2013/0114685 A1* | 5/2013 | Kerofsky | ............... | H04N 19/42 |
| | | | | 375/240.03 |
| 2013/0114741 A1* | 5/2013 | Sullivan | ................. | H04N 19/58 |
| | | | | 375/E7.026 |
| 2013/0142257 A1* | 6/2013 | Wang | ..................... | H04N 19/50 |
| | | | | 375/240.12 |
| 2013/0155184 A1* | 6/2013 | Chen | ................... | H04N 19/597 |
| | | | | 348/43 |
| 2013/0177082 A1* | 7/2013 | Sugio | .................... | H04N 19/52 |
| | | | | 375/240.16 |
| 2013/0188707 A1 | 7/2013 | Deshpande | | |
| 2013/0188709 A1* | 7/2013 | Deshpande | ............ | H04N 19/70 |
| | | | | 375/E7.02 |
| 2013/0188881 A1* | 7/2013 | Zhao | .................... | H04N 19/463 |
| | | | | 382/233 |
| 2013/0235152 A1* | 9/2013 | Hannuksela | ......... | H04N 19/114 |
| | | | | 348/43 |
| 2014/0092997 A1* | 4/2014 | Zhou | ..................... | H04N 19/65 |
| | | | | 375/E7.189 |
| 2014/0286416 A1* | 9/2014 | Jeon | .................... | H04N 19/593 |
| | | | | 375/240.12 |

OTHER PUBLICATIONS

Written Opinion of the International Searching Authority for International Application No. PCT/EP2013/077229 mailed Mar. 25, 2014, 8 pages.

Written Opinion of the International Preliminary Examining Authority for International Application No. PCT/ EP2013/077229 mailed Dec. 22, 2014, 4 pages.

International Preliminary Report on Patentability, PCT Application No. PCT/EP2013/077229, Apr. 8, 2015.

Notice of Grounds for Rejection and English language translation, Japanese Application No. 2015-552053, Dec. 4, 2015.

Hendry et al., "AHG9: On RPS derivation and marking process for long-term reference pictures", Document: JCTVC-L0254_rl, Joint Collaborative Team on Video Coding (JCT-VC) of ITU-T SG 16 WP3 and ISO/IEC JTC 1/SC 29/WG 11, 12th Meeting, Geneva, CH, Jan. 14-23, 2013, 7 pp.

Hendry et al., "Restriction for handling long-term reference pictures", Document: JCTVC-L0443, Joint Collaborative Team on Video Coding (JCT-VC) of ITU-T SG 16 WP3 and ISO/IEC JTC 1/SC 29/WG 11, 12th Meeting, Geneva, CH, Jan. 14-23, 2013, 3 pp.

A. Ramasubramonian et al: "AHG13: On signaling of MSB cycle for long-term reference pictures", Joint Collaborative Team on Video Coding (JCT-VC) of ITU-T SG 16 WP 3 and ISO/IEC JTC 1/SC 29/WG 11; 10th Meeting: Stockholm, SE, Jul. 11-20, 2012; Document: JCTVC-J0118; URL: http://wftp3.itu.int/av-arch/jctvc-site/,, No. JCTVC-J0118, Jul. 3, 2012; 5 pages.

A. Ramasubramonian et al: "AHG15: Signaling of long-term reference pictures in the SPS", Joint Collaborative Team on Video Coding (JCT-VC) of ITU-T SG16 WP3 and ISO/IEC JTC1/SC29/WG11; 9th Meeting: Geneva, CH, Apr. 27-May 7, 2012; Document: JCTVC-I0340; URL: http://wftp3.itu.int/av-arch/jctvc-site/,, No. JCTVC-J0340, Apr. 17, 2012; 6 pages.

J. Samuelsson et al: "Single inclusion of long-term reference pictures in RPS", Joint Collaborative Team on Video Coding (JCT-VC) of ITU-T SG 16 WP 3 and ISO/IEC JTC 1/SC 29/WG 11; 11th Meeting: Shanghai, CN, Oct. 10-19, 2012; Document: JCTVC-K0235 m26567; URL: http://wftp3.itu.int/av-arch/jctvc-site/,, No. JCTVC-K0235, Oct. 1, 2012, 3 pages.

Sjöberg et al., "AHG15: Fix for an unhandled long-term picture case", Document: JCTVC-10234_rl m24476, Joint Collaborative Team on Video Coding (JCT-VC) of ITU-T SG 16 WP3 and ISO/IEC JTC 1/SC 29/WG 11, 9th Meeting, Geneva, CH, Apr. 27-May 7, 2012, 4 pp.

R. Sjoberg et al: "Overview of HEVC High-Level Syntax and Reference Picture Management", IEEE Transactions on Circuits and Systems for Video Technology, IEEE Service Center, Piscataway, NJ, vol. 22, No. 12, Dec. 1, 2012, pp. 1858-1870.

K. Suehring et al: "AHG15: Long-term picture signaling for error-free environments", Joint Collaborative Team on Video Coding (JCT-VC) of ITU-T SG16 WP3 and ISO/IEC JTC 1/SC29/WG11; 9th Meeting: Geneva, CH, Apr. 27-May 7, 2012; Document: JCTVC-10112; URL: http://wftp3.itu.int/av-arch/jctvc-site/,, No. JCTVC-10112, Apr. 16, 2012, 7 pages.

Y-K Wang et al: "AHG15: On reference picture set", Joint Collaborative Team on Video Coding (JCT-VC) of ITU-T SG16 WP3 and ISO/IEC JTC1/SC29/WG11; 9th Meeting: Geneva, CH, Apr. 27-May 7, 2012; Document: JCTVC- 10342; URL: http://wftp3.itu.int/av-arch/jctvc-site/, No. JCTVC-10342, Apr. 17, 2012, 6 pages.

Extended European Search Report for European Patent Application No. 16187030.8 dated Oct. 19, 2016.

First Examination Report for New Zealand Patent Application No. 708943 dated Dec. 11, 2017.

(56)            References Cited

OTHER PUBLICATIONS

European Search Report for European Patent Application No.
18172374.3 dated Aug. 6, 2018, 6 paqes.
Communication pursuant to Rule 69 EPC for European Patent
Application No. 18172374.3 dated Nov. 12, 2018, 2 pages.

* cited by examiner

900 Start 901 obtain least significant bits of picture order count 902 obtain flag for long term reference picture 903 Conclude non-compliant bitstream 904 End 1001 Decoder 1002    1003 bitstream

DECODER AND ENCODER AND METHODS FOR CODING OF A VIDEO SEQUENCE

CROSS REFERENCE TO RELATED APPLICATIONS

This application is a continuation of U.S. patent application Ser. No. 18/239,354 filed on Aug. 29, 2023 (now U.S. Pat. No. 11,818,392), which itself is a continuation of U.S. patent application Ser. No. 17/667,627 filed on Feb. 9, 2022, which itself is a continuation of Ser. No. 17/221,333, filed 2 Apr. 2021 (now U.S. Pat. No. 11,284,106) which itself is a continuation of U.S. patent application Ser. No. 16/589,505, filed 1 Oct. 2019 (now U.S. Pat. No. 10,999,600) which itself is a continuation of U.S. patent application Ser. No. 15/984,573, filed 21 May 2018 (now U.S. Pat. No. 10,477,239), which itself is a continuation of U.S. patent application Ser. No. 15/014,543, filed 3 Feb. 2016 (now U.S. Pat. No. 9,998,758), which itself is a continuation of U.S. patent application Ser. No. 14/420,408, filed 9 Feb. 2015 (now U.S. Pat. No. 9,300,965), which itself is a 35 U.S.C. § 371 national stage application of PCT International Application No. PCT/EP2013/077229, filed on 18 Dec. 2013, which itself claims the benefit of U.S. provisional Patent Application No. 61/753,158, filed 16 Jan. 2013, the disclosures and contents of which are incorporated by reference herein in their entirety. The above-referenced PCT International Application was published in the English language as International Publication No. WO 2014/111222 A1 on 24 Jul. 2014.

TECHNICAL FIELD

Embodiments herein relate to video coding. In particular, a decoder and a method therein for decoding a bitstream to obtain a video sequence as well as an encoder and a method therein for encoding a video sequence are disclosed. Moreover, corresponding computer programs and computer program products are disclosed.

BACKGROUND

With video coding technologies, it is often desired to compress a video sequence into a coded video sequence. The video sequence may for example have been captured by a video camera. A purpose of compressing the video sequence is to reduce a size, e.g. in bits, of the video sequence. In this manner, the coded video sequence will require smaller memory when stored and/or less bandwidth when transmitted from e.g. the video camera. A so called encoder is often used to perform compression, or encoding, of the video sequence. Hence, the video camera may comprise the encoder. The coded video sequence may be transmitted from the video camera to a display device, such as a television set (TV) or the like. In order for the TV to be able to decompress, or decode, the coded video sequence, it may comprise a so called decoder. This means that the decoder is used to decode the received coded video sequence. In other scenarios, the encoder may be comprised in a radio base station of a cellular communication system and the decoder may be comprised in a wireless device, such as a cellular phone or the like, and vice versa.

A known video coding technology is called High Efficiency Video Coding (HEVC), which is a new video coding standard, currently being developed by Joint Collaborative Team-Video Coding (JCT-VC). JCT-VC is a collaborative project between Moving Pictures Expert Group (MPEG) and International Telecommunication Union's Telecommunication Standardization Sector (ITU-T).

HEVC is a hybrid codec that use multiple reference pictures for inter prediction. HEVC includes a picture marking process in which reference pictures can be marked as "used for short-term reference", "used for long-term reference" and "unused for reference". If marked "unused for reference", the picture cannot be used for inter prediction any more. The marking process in HEVC is controlled by Reference Picture Sets (RPSs). An RPS is a set of picture identifiers that identifies reference pictures. The set is sent in each slice and reference pictures will be kept in the Decoded Picture Buffer (DPB) if they are present in the RPS. A slice is a spatially distinct region of a frame that is encoded independently from any other region in the same frame. The RPS part of the slice segment header syntax is shown in Table 1.

Pictures in HEVC are identified by their Picture Order Count (POC) values, also known as full POC values. Each slice contains a code word, pic_order_cnt_lsb, that shall be the same for all slices in a picture. pic_order_cnt_lsb is also known as the least significant bits (lsb) of the full POC since is it a fixed-length code word and only the least significant bits of the full POC is signaled. Both encoder and decoder keep track of POC wrap-around so that full POC values can be assigned to each picture that is encoded/decoded.

Short-term pictures are indicated in the RPS through a pair of numbers, the POC of the reference picture and a flag: used_by_curr_pic_lx_flag. The decoder knows the POC of the reference pictures in the DPB and can match those against the POC values received in the RPS. The flag used_by_curr_pic_lx_flag indicates whether the reference picture is used for reference for the current picture or not.

Long-term pictures are generally indicated in the RPS by the least significant bit (lsb) part of the POC value of the reference picture. However, the HEVC standard has an optional codeword, delta_poc_msb_cycle_lt_minus1, which provides an alternative way of referencing long-term pictures. The long-term picture part of the HEVC slice header syntax is shown at the end of Table 1.

TABLE 1

| RPS slice header syntax | |
|---|---|
| | Descriptor |
| slice_segment_header( ) { | |
| ... | |
|   if( !IdrPicFlag ) { | |
|     pic_order_cnt_lsb | u(v) |
|     short_term_ref_pic_set_sps_flag | u(1) |
|     if( !short_term_ref_pic_set_sps_flag ) | |
|       short_term_ref_pic_set( num_short_term_ ref_pic_sets ) | |
|     else | |
|       short_term_ref_pic_set_idx | u(v) |
|     if( long_term_ref_pics_present_flag ) { | |
|       if( num_long_term_ref_pics_sps > 0 ) | |
|         num_long_term_sps | ue(v) |
|       num_long_term_pics | ue(v) |
|       for( i = 0; i < num_long_term_sps + num_long_term_pics; i++ ) { | |
|         if( i < num_long_term_sps ) | |
|           lt_idx_sps[ i ] | u(v) |
|         else { | |
|           poc_lsb_lt[ i ] | u(v) |
|           used_by_curr_pic_lt_flag[ i ] | u(1) |
|         } | |

TABLE 1-continued

RPS slice header syntax

| | Descriptor |
|---|---|
| delta_poc_msb_present_flag[ i ] | u(1) |
| if( delta_poc_msb_present_flag[ i ] ) | |
|    delta_poc_msb_cycle_lt[ i ] | ue(v) |
| } | |
| } | |

If delta_poc_msb_present_flag is equal to 0, the long-term picture is indicated by the lsb part of its POC only. If delta_poc_msb_present_flag is equal to 1, the long-term picture is indicated by the full POC, i.e. the lsb part of POC and a POC msb cycle used to calculate the msb part of POC. delta_poc_msb_present_flag equal to 1 allows for two long-term pictures to share the same POC lsb. The HEVC standard currently mandates that delta_poc_msb_present_flag shall be equal to 1 whenever there are at least two reference pictures in the DPB with the same POC lsb. This is restricted by the following sentence in the draft HEVC specification, where DeltaPocLt is a list that holds all POC lsb of the long-term pictures in the RPS:

delta_poc_msb_present_flag[i] shall be equal to 1 when there is more than one reference picture in the decoded picture buffer with picture order count modulo MaxPicOrderCntLsb equal to PocLsbLt[i].

This restriction says that when a long-term picture is being indicated by an RPS and there are more than one reference pictures in the decoded picture buffer with the same POC lsb as that long-term picture, the long-term picture indication shall include the signaling of the POC msb cycle, i.e. delta_poc_msb_present_flag shall be equal to 1 for that long-term picture indication in the RPS.

An HEVC bitstream consists of one or more Coded Video Sequences (CVS). A coded video sequence starts, in decoding order, with a first picture that has a picture type that does not use any other picture for prediction and for which all pictures that are present in the DPB are marked "unused for reference" so that no picture in a CVS uses pictures in another CVS for reference. A CVS consists of a series of access units that are sequential in a NAL unit stream, see below, and use only one Sequence Parameter Set (SPS). SPS is defined as a special type of NAL unit, e.g. SPS_NUT. The SPS contains information that is valid for an entire coded video sequence such as picture size or cropping window parameters that are applied to pictures when they are output from the decoder.

HEVC defines temporal sub-layers. For each picture the variable TemporalId, calculated from the syntax element nuh_temporal_id_plus1, in the NAL unit header, indicates which temporal sub-layer the picture belongs to. A lower temporal sub-layer cannot depend on a higher temporal sub-layer and a sub-bitstream extraction process requires that when one or more of the highest temporal sub-layers are removed from a bitstream the remaining bitstream shall be a conforming bitstream. As an example, lower temporal sub-layers may be associated with a display rate, or bit rate, that is lower than a display rate, or a bit rate, corresponding to a higher temporal sub-layer. It shall be understood that temporal sub-layers enable sub-bitstream extraction by only looking at NAL unit headers, it is not necessary to decode other parts of the bitstream.

In HEVC, the encoded pictures are encapsulated in one or more Network Abstraction Layer (NAL) units, forming part of an access unit. NAL units are classified as Video Coding Layer (VCL) units or non-VCL NAL units, such as the above mentioned SPS, according to whether they contain coded picture samples or contain other associated data, respectively. In the HEVC standard, all VCL NAL units of the same picture are required to have the same NAL unit type, which indicates properties about the encoded picture type and may affect the decoding process. The NAL unit types; TRAIL_N, TSA_N, STSA_N, RASL_N and RADL_N are used to indicate that this picture is not used for reference by any picture of the same temporal sub-layer. In this text those pictures are referred to as Non-Reference Temporal Sub-Layer (NRTSL) pictures. The NAL unit types RSV_VCL_N10, RSV_VCL_N12, or RSV_VCL_N14 are reserved for use in future versions of the HEVC specification but they are already now required to have the properties of NRTSL pictures and may thus be considered to be NRTSL pictures even though it is not yet allowed to use these NAL unit types in conforming bit streams. All other picture types are in this text referred to as Reference Temporal Sub-Layer (RTSL) pictures.

For a NRTSL picture X, if the temporal sub-layer that X belongs to is the highest temporal sub-layer that is decoded it will be possible to remove X, i.e. all the NAL units carrying the picture X, from the bitstream without affecting decodability of the remaining stream. However, the DPB might contain different pictures when the picture Y that follows X in decoding order is to be decoded depending on if X was decoded or discarded. It might be the case that, when a picture X is removed, the DPB could contain two long-term reference pictures in the DPB with the same POC lsb when Y is decoded but this would not have been the case if X would have been received. Therefore, the encoder may have used delta_poc_msb_present_flag equal to 0 for a case for which that is ok when X is present in the bitstream but violates the constraint previously mentioned when X has been removed. The decoding process for this case is undefined. Thus, for this case it is not possible to remove X from the bitstream without affecting decodability of the remaining stream.

The same situation can occur when removing individual pictures from higher temporal sub-layers.

Consider the following example:

8 bits are used for pic_order_cnt_lsb. This means that POC lsb values are in the range of 0 to 255, inclusive. The POC of the picture X is 257 and pictures with POC 0 and 256 are both long-term pictures that are present in the DPB marked as "used for long-term reference". Both of these long-term reference pictures will have POC lsb equal to 0. Assume that only the picture with POC 0 is present in the RPS of picture X, i.e. the picture with POC 256 shall be removed from the DPB. HEVC contains the restriction, delta_poc_msb_present_flag[i] shall be equal to 1 when there is more than one reference picture in the decoded picture buffer with picture order count modulo MaxPicOrderCntLsb equal to PocLsbLt[i].

Thus, picture X must signal delta_poc_msb_present_flag equal to 1 for the picture with POC 0.

When the RPS of picture X has been decoded there will only be one picture in the DPB with POC lsb equal to 0.

Assume that picture Y follows X in decoding order, has POC 258, and indicates in its RPS that the long-term picture with POC equal to 0 shall be kept as a reference picture in the DPB. When Y is decoded there will only be one picture in the DPB with POC lsb equal to 0. Thus, it is not required that delta_poc_msb_present_flag is equal to 1 for that picture in the RPS of picture Y.

If X was a NRTSL picture in the same temporal sub-layer as Y or if X was encoded in a higher temporal sub-layer than Y then it should be possible to remove X without affecting the decodability of Y. However, if picture X is removed, there will be two long-term reference pictures in the DPB with POC lsb equal to 0 and since delta_poc_msb_present_flag is equal to 0 for the long-term reference picture with POC lsb equal to 0 in the RPS of Y, it is not defined in the decoding process which one of these pictures to keep as a reference picture in the DPB. Thus, the remaining bit stream is not decodable and the intent of the NRTSL picture type and temporal layering is broken.

SUMMARY

An object may be how to improve encoding of HEVC compliant bitstreams.

According to a first aspect, the object is achieved by a method, performed by an encoder, for encoding a video sequence. When encoding a current picture of the video sequence, the encoder performs the following. The encoder calculates an indication to a previous reference picture. The previous reference picture is located before the current picture in decoding order. The previous reference picture is, relatively to the current picture, a closest previous reference picture, in decoding order, that has a temporal identity equal to zero. The encoder creates a first set of indicators to previous pictures. The first set comprises the indication to the previous reference picture, a second set of indicators to all reference pictures included in a first Reference Picture Set (RPS) of the previous reference picture, and a third set of indicators to all pictures that follow the previous reference picture in decoding order and precede the current picture in decoding order. When a long term reference picture in a second RPS of the current picture has least significant bits of a picture order count, for which more than one picture indicated in the first set share the same value of the least significant bits of picture order count as the long term reference picture, the encoder sets a flag for the long term reference picture. The flag indicates use of a picture order count cycle and least significant bits of the picture order count for indicating the long term reference picture in the second RPS.

According to a second aspect, the object is achieved by an encoder configured to encode a video sequence. The encoder is configured as follows to encode a current picture of the video sequence. Accordingly, the encoder is configured to calculate an indication to a previous reference picture. The previous reference picture is located before the current picture in decoding order. The previous reference picture is, relatively to the current picture, a closest previous reference picture, in decoding order, that has a temporal identity equal to zero. Moreover, the encoder is configured to create a first set of indicators to previous pictures. The first set comprises the indication to the previous reference picture, a second set of indicators to all reference pictures included in a first RPS of the previous reference picture, and a third set of indicators to all pictures that follow the previous reference picture in decoding order and precede the current picture in decoding order. Furthermore, the encoder is configured to set a flag for the long term reference picture, when a long term reference picture in a second RPS of the current picture has least significant bits of a picture order count, for which more than one picture indicated in the first set share the same value of the least significant bits of picture order count as the long term reference picture. The flag indicates use of a picture order count cycle and least significant bits of the picture order count for indicating the long term reference picture in the second RPS.

According to a third aspect, the object is achieved by a method, performed by a decoder, for decoding a bitstream to obtain a video sequence. When decoding a current picture from the bitstream the decoder performs the following. The decoder obtains, from the bitstream, least significant bits of a picture order count for a long term reference picture included in a reference picture set of the current picture. The decoder obtains a flag for said long term reference picture. The flag indicates whether or not to use a picture order count cycle. When the flag indicates that the picture order count cycle is not used and the least significant bits match more than one reference picture in a decoded picture buffer of the decoder, the decoder concludes that the bitstream is a non-compliant bitstream.

According to a fourth aspect, the object is achieved by a decoder configured to decode a bitstream to obtain a video sequence. The decoder is configured as follows to decode a current picture from the bitstream. Accordingly, the decoder is configured to obtain, from the bitstream, least significant bits of a picture order count for a long term reference picture included in a reference picture set of the current picture. Moreover, the decoder is configured to obtain a flag for said long term reference picture. The flag indicates whether or not to use a picture order count cycle. Furthermore, the decoder is configured to conclude that the bitstream is a non-compliant bitstream, when the flag indicates that the picture order count cycle is not used and the least significant bits match more than one reference picture in a decoded picture buffer of the decoder.

According to a fifth aspect, the object is achieved by a method, performed by an encoder, for encoding a video sequence. When encoding a current picture of the video sequence and for each long term reference picture in a RPS of the current picture, the encoder performs the following. The encoder stores a respective picture order count of said each long term reference picture in a list of picture order counts. When the list includes a picture order count that is different from the respective picture order count and when the picture order count has least significant bits that are equal to least significant bits of the respective picture order count, the encoder sets a flag for said each long term reference picture. The flag indicates use of a picture order count cycle and least significant bits of the picture order count for indicating the long term reference picture in the RPS of the current picture.

According to a sixth aspect, the object is achieved by an encoder configured to encode a video sequence. The encoder is configured as follows to encode a current picture of the video sequence and for each long term reference picture in a RPS of the current picture. Accordingly, the encoder is configured to store a respective picture order count of said each long term reference picture in a list of picture order counts. Moreover, the encoder is configured to set a flag for said each long term reference picture, when the list includes a picture order count that is different from the respective picture order count and when the picture order count has least significant bits that are equal to least significant bits of the respective picture order count. The flag indicates use of a picture order count cycle and least significant bits of the picture order count for indicating the long term reference picture in the RPS of the current picture.

According to a seventh aspect, the object is achieved by a computer program comprising computer readable code units which when executed on an encoder causes the encoder to perform the methods described herein.

According to an eighth aspect, the object is achieved by a computer program product, comprising computer readable medium and a computer program, as mentioned directly above, stored on the computer readable medium.

According to a ninth aspect, the object is achieved by a computer program comprising computer readable code units which when executed on a decoder causes the decoder to perform the methods described herein.

According to a tenth aspect, the object is achieved by a computer program product, comprising computer readable medium and a computer program, as mentioned directly above, stored on the computer readable medium.

Thanks to that the encoder carefully check when to set the flag, ambiguities regarding long-term picture indications in HEVC, when temporal layers have been removed, are avoided. Thus, at least one of the embodiments herein provides the ability to remove pictures from the bitstream without affecting decodability of the stream when the picture has a type or belongs to a temporal sub-layer such that it should be possible to remove.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
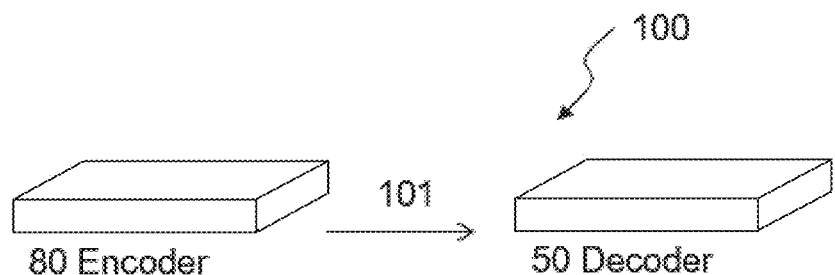
FIG. 1 is a schematic overview of an exemplifying system in which embodiments herein may be implemented.

Throughout the following description similar reference numerals have been used to denote similar elements, units, modules, circuits, nodes, parts, items or features, when applicable. In the Figures, features that appear in some embodiments may be indicated by dashed lines.

FIG. 1 depicts a scenario in which embodiments herein are implemented in an exemplifying system 100. The system comprises a decoder 50 and an encoder 80.

The decoder 50 and/or the encoder 80 may be comprised in television set-top-boxes, video players/recorders, such as video cameras, Blu-ray players, Digital Versatile Disc (DVD)-players, media centers, media players and the like.

Figure 2:
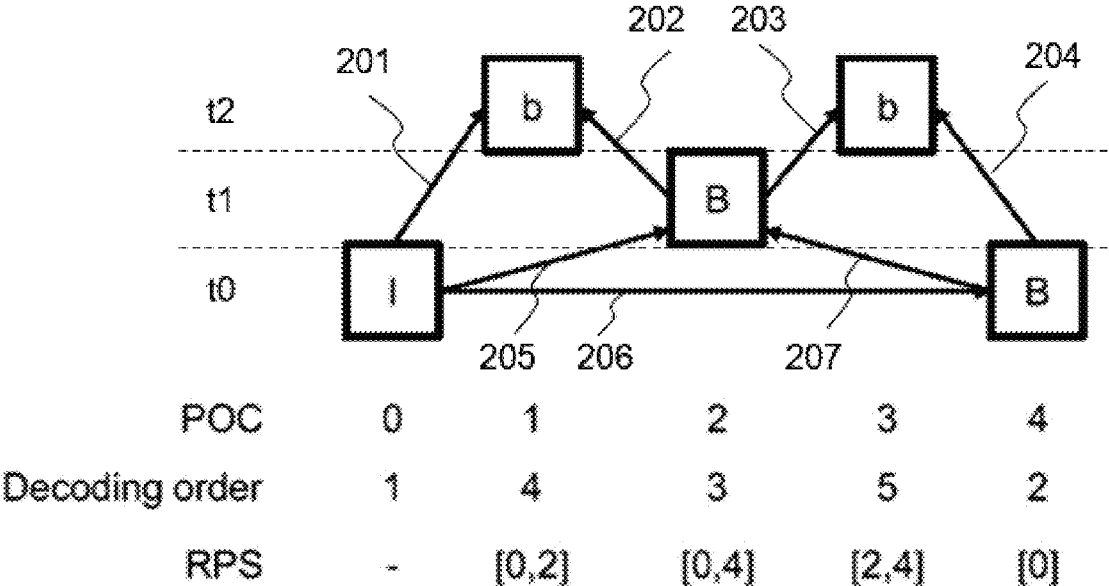
FIG. 2 is a block diagram illustrating relation between picture order count, decoding order and reference picture set.

FIG. 2 illustrates relations between Picture Order Count (POC), decoding order and Reference Picture Set (RPS). For decoding of a picture certain so called reference pictures are used 201-207 as reference pictures. As an example, for decoding of picture with POC=1, pictures POC-0 and POC=2 are used 201, 202 as reference pictures. A Reference Picture Set (RPS) includes POC values of these reference pictures, e.g. RPS=[0, 2]. Note that the RPS may comprise further pictures than those indicated here for picture POC=1.

The POC values refer to an order in which pictures of a coded video sequence are to be output, or displayed when shown to a viewer, e.g. a user, a person, a detector and the like. The POC value is indicated in a slice header of a current picture. Decoding order refer to an order in which pictures of a coded video sequence are to be decoded. In FIG. 2, pictures "b" requires that pictures "B" are decoded before the pictures "b" can be decoded.

Looking at FIG. 2, picture with POC=1 is a previous picture to picture with POC=2 respect to POC, or output order, since 1<2. However, picture "B" with POC=2 is a previous picture to picture "b" with POC=1 with respect to decoding order as described above.

Reference Picture Set (RPS) refers to which pictures are to be kept marked as reference pictures. This means that for a current picture, the decoding thereof does not have to use all reference pictures in the DPB, e.g. some pictures may be marked as reference pictures for future use. Hence, for picture with POC=1, we have that the RPS is [0, 2] since the arrows in FIG. 2 indicate that pictures with POC=0 and POC=2 needs to be decoded before picture with POC=1 can be decoded. In practice, the RPS of the picture with POC=1 must also include POC=4 since that picture is used when decoding the picture with POC=3.

Moreover, a first temporal layer t0 with temporal identity equal to zero is illustrated. Increasingly higher temporal layers t1, t2 are also shown. A purpose of temporal layers is to partition pictures into layers such that a higher temporal layer may be removed, e.g. from a bitstream, without affecting decodability of pictures belonging to lower layers. As a consequence, it is defined that a lower temporal layer cannot use a picture in a higher temporal layer as a reference picture. \

Figure 3:
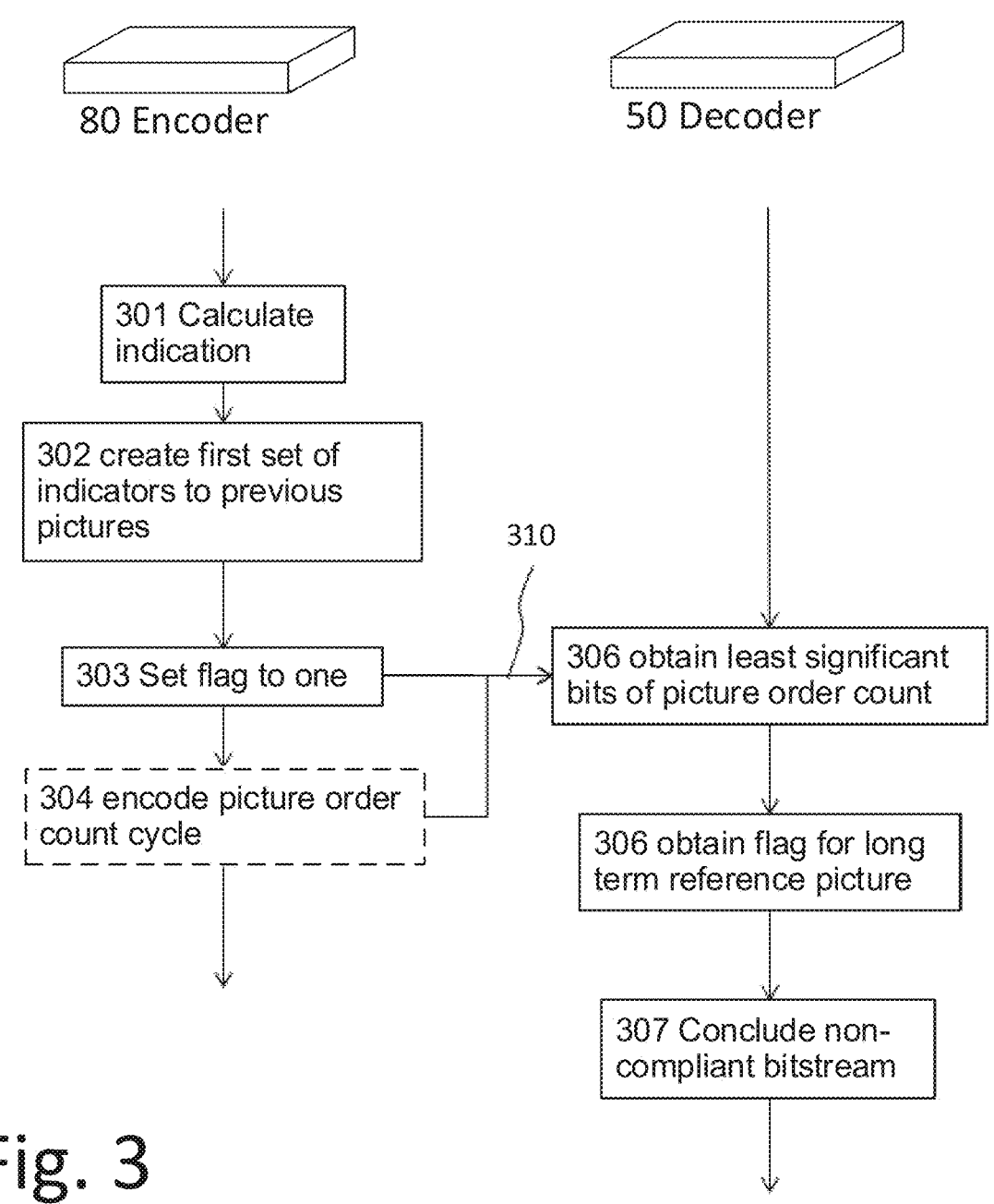
FIG. 3 is a schematic, combined signaling scheme and flowchart illustrating embodiments of the methods when performed in the system according to FIG. 1.

FIG. 3 illustrates exemplifying methods in the decoder 50 and the encoder 80, which are shown in FIG. 1. Thus, the encoder 80 performs a method for encoding a video sequence, and the decoder 50 performs a method for decoding a bitstream 310 to obtain a video sequence. The video sequence may be comprised in the bitstream 310, e.g. in the form of a coded video sequence. The bitstream may be a HEVC compliant bitstream.

Action 301 to 304 may be performed when encoding a current picture of the video sequence. Action 305 to 307 may be performed when decoding a current picture from the bitstream.

Action 301

In order to be able to possibly use an indication in action 302, the encoder 80 calculates the indication to a previous reference picture. The previous reference picture is located before the current picture in decoding order. The previous reference picture is, relatively to the current picture, a closest previous reference picture, in decoding order, that has a temporal identity equal to zero.

In some examples, the indication to the previous reference picture may be the previous reference picture itself, which sometimes is denoted prevTid0Pic. Therefore, the indication may be the previous picture in decoding order that has TemporalId equal to 0 and is not a RASL picture, a RADL picture, or a sub-layer non-reference picture.

The temporal identity of the previous reference picture may be indicated in a previous NAL unit of the previous reference picture.

Action 302

In order to keep track of which POC values have been used, the encoder 80 creates a first set of indicators to previous pictures. The first set comprises:

the indication to the previous reference picture, a second set of indicators to all reference pictures included in a first RPS of the previous reference picture, and a third set of indicators to all pictures that follow the previous reference picture, indicated by the indication, in decoding order and precede the current picture in decoding order.

It shall be understood that the expression "indicator to" may mean that the indicator points to some picture.

The first reference picture set may be comprised in a previous slice header of the previous reference picture.

Action 303

Action 303 is performed when a long term reference picture in a second RPS of the current picture has least significant bits of a picture order count, for which more than one picture indicated in the first set share the same value of the least significant bits of picture order count as the long term reference picture. Thus, when this action is performed, the encoder 80 sets a flag for the long term reference picture. This means e.g. that the encoder 80 assigns the flag a value of one. The flag indicates use of a picture order count cycle and least significant bits of the picture order count for indicating the long term reference picture in the second RPS. The second RPS may comprise the long term reference picture or a pointer thereto. Therefore, the long term reference picture may in some examples be a long term reference picture indication.

Sometimes, the flag may be referred to as delta_poc_msb_present_flag. Moreover, the picture order count cycle may be referred to as delta_poc_msb_cycle_lt.

The picture order count may indicate order in which pictures of the video sequence are to be output, e.g. to a display device, such as a TV or the like.

When a long term reference picture in the second RPS of the current picture has least significant bits of a picture order count, for which zero or one picture indicated in the first set share the same value of the least significant bits of picture order count as the long term reference picture, the encoder 80 clears the flag, e.g. assigns a value of zero to the flag.

Action 304

In order to inform the decoder 50 about the picture order count cycle, the encoder 80 may encode the picture order count cycle into the current NAL unit of the current picture. Thus, the bitstream 310 may comprise the picture order count cycle.

Action 305

In order to be able to perform action 307, the decoder 50 obtains, from the bitstream, least significant bits of a picture order count for a long term reference picture included in a reference picture set of the current picture. In relation to action 305, the picture order count in the RPS is used to indicate which pictures to keep as reference pictures in the DPB. The picture order count indicates order in which pictures of the video sequence are to be output.

The least significant bits may be obtained from the current NAL unit.

Action 306

Also in order to be able to perform action 307, the decoder 50 obtains a flag for said long term reference picture. The flag indicates whether or not to use a picture order count cycle. The flag may have been encoded into the bitstream by the encoder 80.

Each picture of the bitstream may comprise at least one NAL unit. Each picture may be decoded from a slice comprised in said at least one NAL unit. The slice may comprise a slice header. The slice header may comprise the flag. The current picture of the video sequence may be decoded from a current slice, having a current slice header. The current slice may be decoded from a current NAL unit. In some examples, said each picture comprises a plurality of NAL units. Thus, there may be a plurality of slices for said each picture.

Action 307

When the flag indicates that the picture order count cycle is not used and the least significant bits, obtained in action 305, match more than one reference picture in a decoded picture buffer of the decoder 50, the decoder 50 concludes that the bitstream is a non-compliant bitstream, e.g. non-compliance to HEVC. The decoded picture buffer may comprise pictures decoded before, in decoding order, the current picture.

According to some first embodiments, let prevTid0Pic be the previous RTSL picture in decoding order that has TemporalId equal to 0, i.e. the lowest temporal sub-layer. As an example, prevTid0Pic may be the previous picture in decoding order that has TemporalId equal to 0 and is not a RASL picture, a RADL picture, or a sub-layer non-reference picture.

In these first embodiments a restriction is imposed on the bitstream. The restriction applies when there are at least two pictures with the same POC lsb in the set of pictures consisting of; prevTid0Pic, the pictures in the RPS of prevTid0Pic, and all pictures that follows prevTid0Pic in decoding order and precedes the current picture in decoding order. Moreover, when applying the restriction, it will then imply that syntax elements, such as POC msb cycle, used to calculate the full POC value must be signaled for the long-term pictures with that same POC lsb that is included in the RPS of the current picture.

An alternative way of expressing the restriction is that a long-term reference picture Z has to be signaled with delta_poc_msb_present_flag equal to 1 when there are at least two pictures with POC lsb equal to the POC lsb of Z in the set of pictures consisting of: prevTid0Pic, the pictures in the RPS of prevTid0Pic, and all pictures that follows prevTid0Pic in decoding order and precedes the current picture in decoding order.

One way of formulating the restriction is:

Let prevTid0Pic be the previous picture in decoding order that has nal_unit_type not equal to TRAIL_N, TSA_N, STSA_N, RADL_N nor RASL_N and that has TemporalId equal to 0.

Let setOfPreviousPictures be the set consisting of:
prevTid0Pic
all the pictures in the RPS of prevTid0Pic
all the pictures that follows prevTid0Pic in decoding order and precedes the current picture in decoding order.

delta_poc_msb_present_flag[i] shall be equal to 1 when there is more than one picture in the setOfPreviousPictures with picture order count modulo MaxPicOrderCntLsb equal to PocLsbLt[i].

Alternatively prevTid0Pic is deduced as:

Let prevTid0Pic be the previous reference picture in decoding order that has TemporalId equal to 0.

Alternatively PrevTidPic is defined globally for example as:

PrevTid0Pic is set equal to the previous picture in decoding order that has nal_unit_type not equal to TRAIL_N, TSA_N, STSA_N, RADL_N, RASL_N, RSV_VCL_N10, RSV_VCL_N12 or RSV_VCL_N14 and that has TemporalId equal to 0.

The restriction is then formulated as:

Let setOfPreviousPictures be the set consisting of:

PrevTid0Pic all the pictures in the RPS of PrevTid0Pic all the pictures that follows PrevTid0Pic in decoding order and precedes the current picture in decoding order.

delta_poc_msb_present_flag[i] shall be equal to 1 when there is more than one reference picture in the setOfPreviousPictures with picture order count modulo MaxPicOrderCntLsb equal to PocLsbLt[i].

An encoder may be configured to use the embodiment according to the following steps:

1. The encoder stores (or calculates) the information of which picture is the PrevTid0Pic, i.e. the previous picture in decoding order that has nal_unit_type not equal to TRAIL_N, TSA_N, STSA_N, RADL_N, RASL_N, RSV_VCL_N10, RSV_VCL_N12 or RSV_VCL_N14 and that has TemporalId equal to 0.

2. A set, setOfPreviousPictures, is created consisting of PrevTid0Pic, all the pictures in the RPS of PrevTid0Pic and all the pictures that follows PrevTid0Pic in decoding order and precedes the current picture in decoding order.

3. Whenever the encoder wishes to signal a long-term reference picture in the RPS that has a POC lsb for which there are more than one picture in setOfPreviousPictures with the same POC lsb, then delta_poc_msb_present_flag is signaled equal to 1 for that picture, i.e. the POC msb cycle is signaled for that picture.

Expressed in a different way an encoder may be configured to use the embodiment according to the following steps:

1. The encoder stores (or calculates) the information of which picture is the PrevTid0Pic, i.e. the previous picture in decoding order that is not a non-reference picture in its temporal sub-layer and that has TemporalId equal to 0.

2. A set, setOfPreviousPictures, is created consisting of PrevTid0Pic, all the pictures in the RPS of PrevTid0Pic and all the pictures that follows PrevTid0Pic in decoding order and precedes the current picture in decoding order.

3. Whenever the encoder wishes to signal a long-term reference picture in the RPS that has a POC lsb for which there are more than one picture in setOfPreviousPictures with the same POC lsb, then delta_poc_msb_present_flag is signaled equal to 1 for that picture, i.e. the POC msb cycle is signaled for that picture.

Alternatively PrevTidOPic is defined as

PrevTidOPic is set equal to the previous temporal sub-layer reference picture in decoding order that has TemporalId equal to 0.

A Reference Temporal Sub-Layer (RTSL) picture is then defined as a picture that has nal_unit_type not equal to TRAIL_N, TSA_N, STSA_N, RADL_N, RASL_N, RSV_VCL_N10, RSV_VCL_N12 or RSV_VCL_N14.

A decoder may use the embodiment according to the following steps

1. The decoder receives a slice and parses syntax elements in the slice segment header including the RPS related syntax elements.

2. If there are two reference pictures in the DPB, such as one short-term and one long-term reference picture, two long-term reference pictures or the like, with the same POC lsb and the current RPS contains an entry with PocLsbLt[i] equal to that POC lsb and delta_poc_msb_present_flag equal to 0, the decoder concludes that the bitstream is not compliant with the HEVC standard and can interpret that as a bit-error, loss of data or non-compliant bitstream or encoder. It may report the error, perform error concealment or take other actions based on the knowledge that the bitstream is not compliant. The decoder further concludes that the bitstream was not created from an HEVC compliant bitstream through removal of one or more individual pictures from higher temporal layers or through removal of a NRTSL picture from the same temporal layer as the current picture.

In some second embodiments the encoder is configured to perform the following steps:

1. For each current picture that is to be encoded the following steps are performed:

a. For every picture A that is used as a long-term reference picture, the following steps are performed:

i. the POC value of A is stored by the encoder in a list:

usedLongTermPoc Values.

ii. If there is a POC value in usedLongTermPoc Values that is different from the POC value of A but with a POC lsb that is equal to the POC lsb of A then A is determined to be signaled with POC msb cycle.

b. The RPS of the current picture is signaled with delta_poc_msb_present_flag set according to what was determined in step a.ii.

Figures 4, 5:
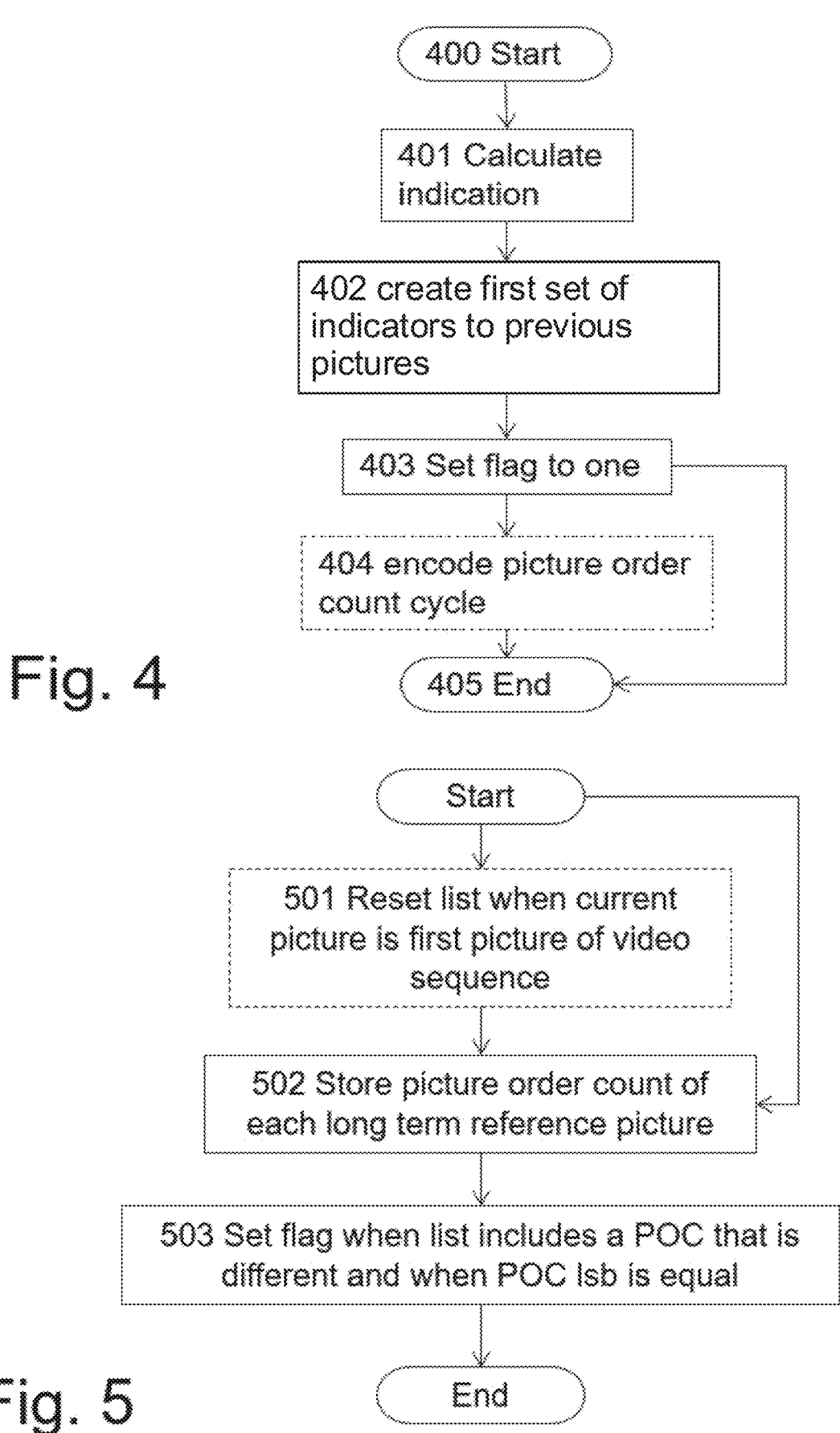
FIG. 4 is a flowchart illustrating embodiments of the method in the encoder.
FIG. 5 is a further flowchart illustrating embodiments of the method in the encoder.

This method is also illustrated in FIG. 5 below.

In one version of the embodiment the list usedLongTermPocValues is reset (emptied) when the encoder starts encoding a new CVS, i.e. not for each new picture.

In another version of the embodiment there is a bitstream restriction that requires that when two different pictures with the same POC lsb in the same coded video sequence are used as long-term reference pictures then POC msb cycle must be signaled for those pictures.

In the current HEVC design, removal of pictures from higher temporal sub-layers or removal of individual Non-Reference Temporal Sub-Layer (NRTSL) pictures from the same temporal sub-layer can create a bitstream that is not decodable due that it is undefined which long-term picture to mark as "unused for reference" when there are two long-term pictures in the DPB with the same POC lsb and the current RPS contains only a reference to one of them and delta_poc_msb_present_flag is equal to 0 for this reference.

The basic concept of the embodiments is to enforce a restriction so that removal of pictures that are non-reference pictures of a temporal sub-layer does not affect decodability of the remaining stream. That is achieved according to the embodiments described below.

According to a first aspect an encoder is configured to implement a restriction so that removal of pictures that are non-reference pictures of a temporal sub-layer does not affect decodability of the remaining stream. "Decodability" is understood to mean the possibility to decode.

A receiver comprising the encoder is also provided.

According to a second aspect a method in an encoder for implementing a restriction so that removal of pictures that are non-reference pictures of a temporal sub-layer does not affect decodability of the remaining stream.

The encoder and/or the decoder can be implemented in a device such as a video camera or a rendering device.

Yet a further related aspect of the embodiments defines a computer program for encoding a picture. The computer program comprises code means, such as computer program text or binary files, which when run by a processor causes the processor to perform one or more embodiments herein.

Another additional aspect of the embodiments relates to a computer program product comprising computer readable medium and a computer program stored on the computer readable medium.

According to a further aspect a decoder is provided. The decoder is configured to receive information relating to the restriction and to use the restriction when decoding the picture.

The embodiments apply to a decoder, an encoder and any element that operates on a bitstream, such as a network node or a Media Aware Network Element (MANE).

The embodiments are not limited to HEVC but may be applied to any extension of HEVC, such as a scalable extension or multi-view extension or to a different video coding standard.

In FIG. 4, an exemplifying, schematic flowchart of the method in the encoder 80 is shown. As mentioned, the encoder 80 performs a method for encoding a video sequence.

As mentioned, the video sequence may be encoded into a bitstream, which may be a HEVC compliant bitstream.

Each picture of the bitstream may comprise at least one NAL unit, wherein each picture may be encoded into at least one slice comprised in said at least one NAL unit. The at least one slice may comprise a slice header. The slice header may comprise the flag. The current picture of the video sequence may be encoded into at least one current slice. The at least one current slice is encoded into a current NAL unit.

When encoding a current picture of the video sequence, the following actions may be performed in any suitable order.

Action 401

The encoder 80 calculates an indication to a previous reference picture. As mentioned, the previous reference picture is located before the current picture in decoding order. The previous reference picture is, relatively to the current picture, a closest previous reference picture, in decoding order, that has a temporal identity equal to zero. This action is similar to action 301.

Action 402

The encoder 80 creates a first set of indicators to previous pictures. The first set comprises:

the indication to the previous reference picture, a second set of indicators to all reference pictures included in a first reference picture set, "RPS", of the previous reference picture, and a third set of indicators to all pictures that follow the previous reference picture in decoding order and precede the current picture in decoding order.

The first reference picture set may be comprised in a previous slice header of the previous reference picture. This action is similar to action 302.

Action 403

The encoder 80 sets a flag for the long term reference picture. The flag indicates use of a picture order count cycle and least significant bits of the picture order count for indicating the long term reference picture in the second RPS. Action 403 is performed when a long term reference picture in a second RPS of the current picture has least significant bits of a picture order count, for which more than one picture indicated in the first set share the same value of the least significant bits of picture order count as the long term reference picture. The picture order count may indicate order in which pictures of the video sequence are to be output. This action is similar to action 303.

Action 404

The encoder 80 may encode the picture order count cycle into the current NAL unit of the current picture. This action is similar to action 304.

In FIG. 5, an exemplifying, schematic flowchart of the method according to the second embodiments in the encoder 80 is shown. As mentioned, the encoder 80 performs a method for encoding a video sequence.

The following actions may be performed in any suitable order.

Action 501

The encoder 80 may reset the list when the current picture may be a first picture of the video sequence, e.g. CVS.

When encoding a current picture of the video sequence, the following actions may be performed for each long term reference picture in a Reference Picture Set, "RPS" of the current picture:

Action 502

The encoder 80 stores a respective picture order count of said each long term reference picture in a list for picture order counts. This action is similar to step 1.a.i above.

Action 503

The encoder 80 sets a flag for said each long term reference picture, when the list includes a picture order count that is different from the respective picture order count and when the picture order count, e.g. in the list, has least significant bits that are equal to least significant bits of the respective picture order count. The flag indicates use of a picture order count cycle and least significant bits of the picture order count for indicating the long term reference picture in the RPS of the current picture. This action is similar to step 1.a.ii above.

Figure 6:
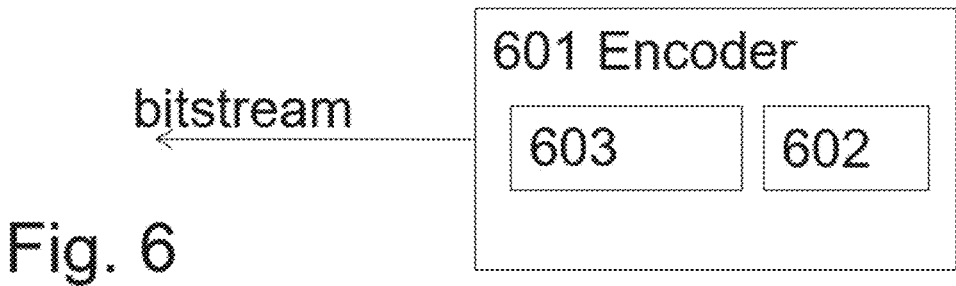
FIG. 6 is a block diagram illustrating embodiments of the encoder.

FIG. 6 is a schematic block diagram of an encoder 601 configured to encode a picture according to an embodiment. The encoder comprises a restriction unit 602, configured to apply the restriction according to any of the described embodiments. Moreover, the encoder comprises an output unit 603 configured to generate and output the bitstream.

Figure 7:
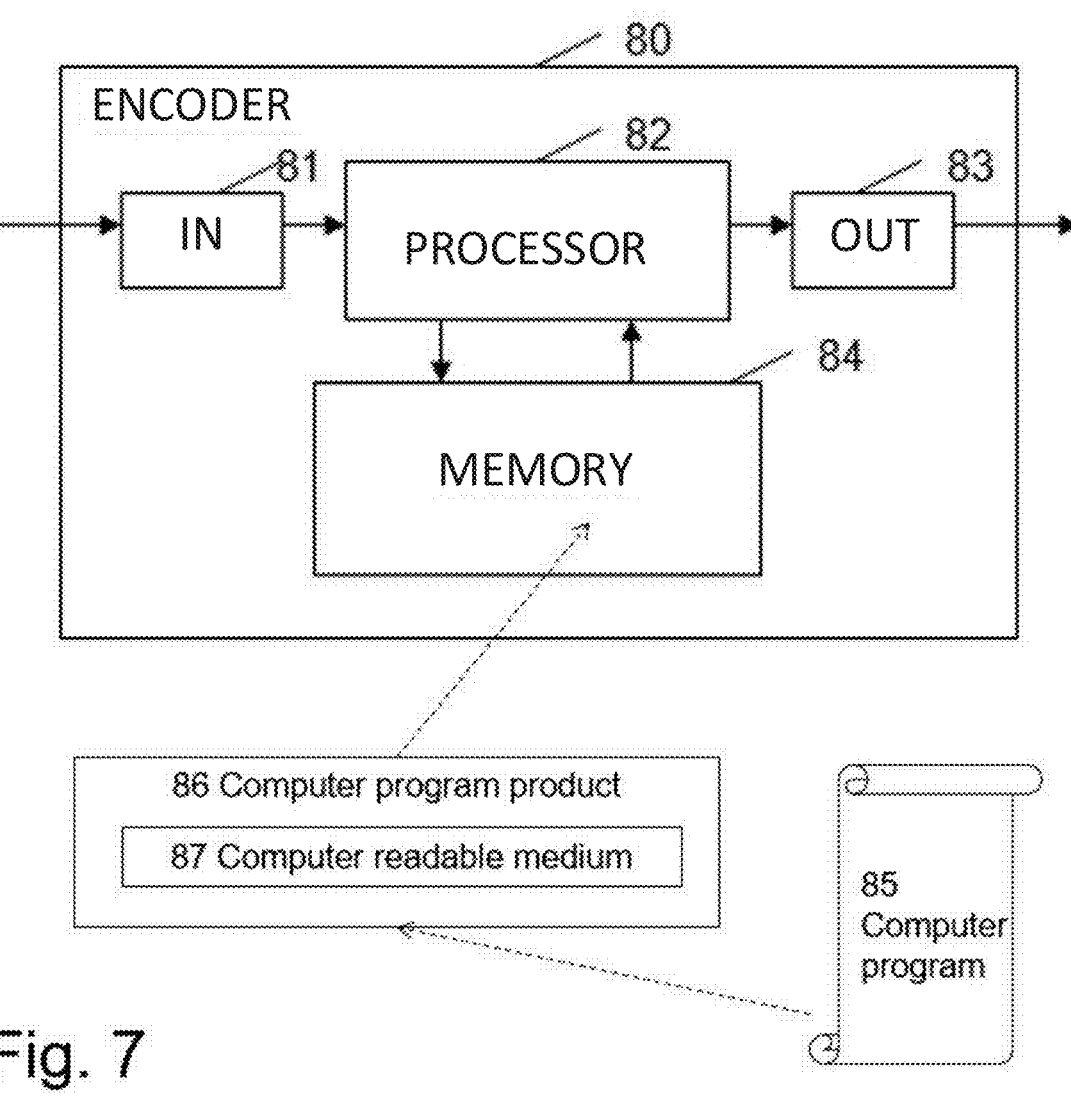
FIG. 7 is another block diagram illustrating embodiments of the encoder.

Now in more detail, with reference to FIG. 7, there is illustrated in more detail the encoder 80 configured to encode a video sequence. The encoder 80 is configured to, when encoding a current picture of the video sequence, calculate an indication to a previous reference picture. The previous reference picture is located before the current picture in decoding order. The previous reference picture is, relatively to the current picture, a closest previous reference picture, in decoding order, that has a temporal identity equal to zero.

Furthermore, the encoder 80 is configured to, when encoding a current picture of the video sequence, create a first set of indicators to previous pictures. The first set comprises:

the indication to the previous reference picture, a second set of indicators to all reference pictures included in a first reference picture set, "RPS", of the previous reference picture, and a third set of indicators to all pictures that follow the previous reference picture in decoding order and precede the current picture in decoding order.

Moreover, the encoder 80 is configured to, when encoding a current picture of the video sequence, set a flag for the long term reference picture, when a long term reference picture in a second RPS of the current picture has least significant bits of a picture order count, for which more than one picture indicated in the first set share the same value of the least significant bits of picture order count as the long term reference picture. The flag indicates use of a picture order count cycle and least significant bits of the picture order count for indicating the long term reference picture in the second RPS.

The encoder 80 may further be configured to encode the picture order count cycle into the current NAL unit of the current picture.

Each picture of the bitstream may comprise at least one NAL unit, wherein each picture may be encoded into at least one slice comprised in said at least one NAL unit. The at least one slice may comprise a slice header. The slice header may comprise the flag. The current picture of the video sequence may be encoded into at least one current slice. The at least one current slice may be encoded into a current NAL unit.

The temporal identity of the previous reference picture may be indicated in a previous NAL unit of the previous reference picture.

The first reference picture set may be comprised in a previous slice header of the previous reference picture.

The picture order count may indicate order in which pictures of the video sequence are to be output.

The bitstream may be a HEVC compliant bitstream.

Furthermore, according to the second embodiments, the encoder 80 is configured to encode a video sequence.

The encoder 80 is configured to, when encoding a current picture of the video sequence and for each long term reference picture in a RPS of the current picture, store a respective picture order count of said each long term reference picture in a list for picture order counts.

Moreover, the encoder 80 is configured to, when encoding a current picture of the video sequence and for each long term reference picture in a RPS of the current picture, set a flag for said each long term reference picture, when the list includes a picture order count that is different from the respective picture order count and when the picture order count has least significant bits that are equal to least significant bits of the respective picture order count. The flag indicates use of a picture order count cycle and least significant bits of the picture order count for indicating the long term reference picture in the RPS of the current picture.

The encoder 80 may further be configured to reset the list when the current picture may be a first picture of the video sequence.

Thus, the encoder 80 described herein could be implemented e.g. by one or more of a processor 82, or processing circuit, and adequate software with suitable storage or memory 84 therefore, a programmable logic device (PLD) or other electronic component(s) as shown in FIG. 7. In addition, the encoder 80 preferably comprises an input or input unit 81 configured to receive the pictures of the video stream. A corresponding output or output unit 83 is configured to output the encoded representations of the slices, preferably in the form of NAL units.

The encoder of FIG. 7 with its including units could be implemented in hardware. There are numerous variants of circuitry elements that can be used and combined to achieve the functions of the units of the encoder. Such variants are encompassed by the embodiments. Particular examples of hardware implementation of the encoder are implementation in digital signal processor (DSP) hardware and integrated circuit technology, including both general-purpose electronic circuitry and application-specific circuitry.

FIG. 7 also illustrates a computer program 85 comprising computer readable code units which when executed on the encoder 80 causes the encoder 80 to perform the method according to FIG. 3, 4 or 5.

Finally, FIG. 7 illustrates a computer program product 86, comprising computer readable medium 87 and the computer program 85 as described directly above stored on the computer readable medium 87.

The computer readable medium may be a memory, a Universal Serial Bus (USB) memory, a DVD-disc, a Blu-ray disc, a software module that is received as a stream of data, a Flash memory, a hard drive etc.

Figure 8:
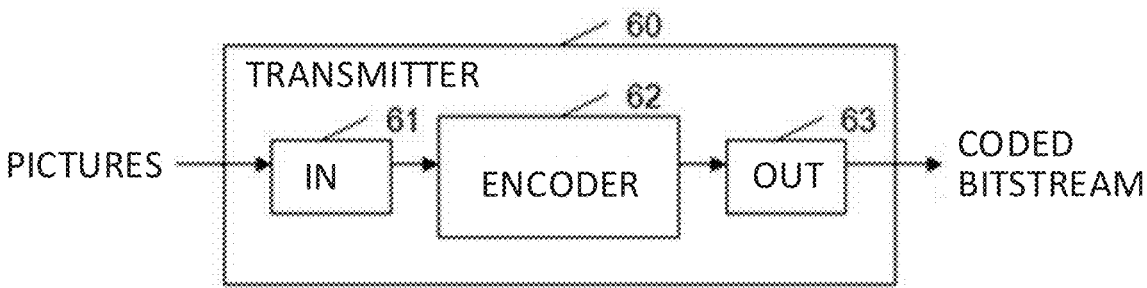
FIG. 8 is a further block diagram illustrating embodiments of the encoder.

Now referring to FIG. 8, an encoder 62 according to embodiments herein may, for example, be located in a transmitter 60 in a video camera e.g. in a mobile device. The transmitter 60 then comprises an input or input unit 61 configured to receive pictures of a video stream to be encoded. The pictures are encoded by the encoder 62 as disclosed herein. Encoded pictures are output from the transmitter 60 by an output or output unit 63 in the form of a coded bitstream, such as of NAL units or data packets carrying such NAL units.

Figure 9:
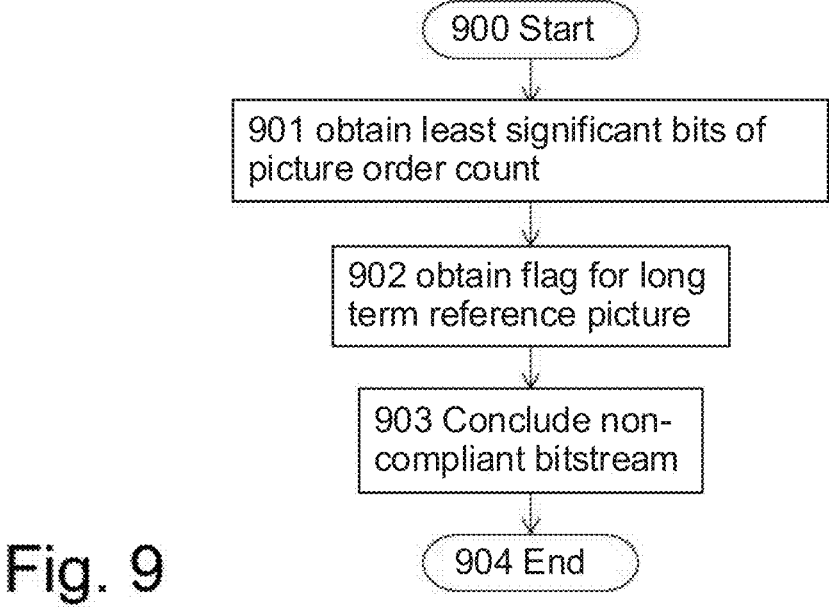
FIG. 9 is a flowchart illustrating embodiments of the method in the decoder.

In FIG. 9, an exemplifying, schematic flowchart of a method, performed by the decoder 50, for decoding a bitstream to obtain a video sequence, is shown.

When decoding a current picture from the bitstream, the following actions may be performed in any suitable order.

Action 901

The decoder 50 obtains, from the bitstream, least significant bits of a picture order count for a long term reference picture included in a reference picture set of the current picture. The least significant bits may be obtained from the current NAL unit. This action is similar to action 305.

Action 902

The decoder 50 obtains a flag for said long term reference picture. The flag indicates whether or not to use a picture order count cycle. This action is similar to action 306.

Each picture of the bitstream may comprise at least one NAL unit, wherein each picture may be decoded from a slice comprised in said at least one NAL unit. The slice may comprise a slice header. The slice header may comprise the flag. The current picture of the video sequence may be decoded from a current slice, having a current slice header. The current slice may be decoded from a current NAL unit.

Action 903

The decoder 50 concludes that the bitstream is a noncompliant bitstream, when the flag indicates that the picture order count cycle is not used and the least significant bits match more than one reference picture in a decoded picture buffer of the decoder 50.

The decoded picture buffer may comprise pictures decoded before, in decoding order, the current picture. The concluding includes concluding non-compliance to HEVC. This action is similar to action 307.

Figure 10:
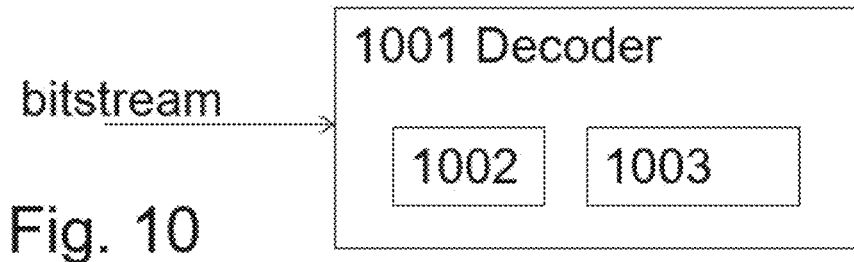
FIG. 10 is a block diagram illustrating embodiments of the decoder.

FIG. 10 is a simplified schematic block diagram of a decoder 1001 according to the embodiments. The decoder comprises an input unit 1002 configured to receive the bitstream having the restriction according to any of the above described embodiments. The decoder further comprises a decoding unit 1003 which is configured to use this restriction when decoding the picture.

Figure 11:
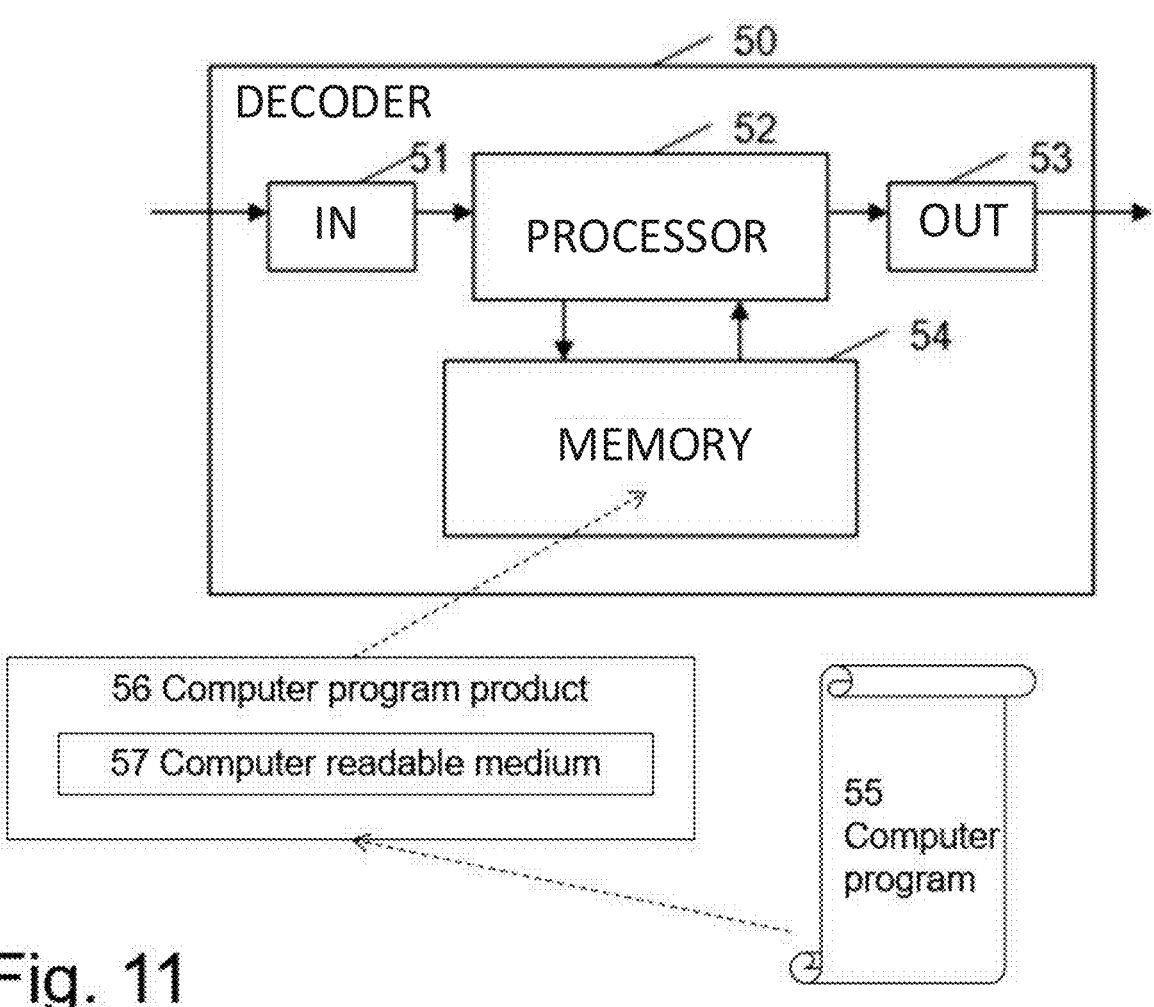
FIG. 11 is another block diagram illustrating embodiments of the decoder.

FIG. 11 shows a block diagram of the decoder 50 configured to decode a bitstream to obtain a video sequence.

The decoder 50 is configured to, when decoding a current picture from the bitstream, obtain from the bitstream least significant bits of a picture order count for a long term reference picture included in a reference picture set of the current picture.

Furthermore, the decoder 50 is configured to, when decoding the current picture from the bitstream, obtain a flag for said long term reference picture. The flag indicates whether or not to use a picture order count cycle.

Moreover, the decoder 50 is configured to, when decoding the current picture from the bitstream, conclude that the bitstream is a non-compliant bitstream, when the flag indicates that the picture order count cycle is not used and the least significant bits match more than one reference picture in a decoded picture buffer of the decoder 50.

The picture order count indicates order in which pictures of the video sequence are to be output.

Each picture of the bitstream may comprise at least one NAL unit, wherein each picture may be decoded from a slice comprised in said at least one NAL unit. The slice may comprise a slice header. The slice header may comprise the flag. The current picture of the video sequence may be decoded from a current slice, having a current slice header. The current slice may be decoded from a current NAL unit.

The least significant bits may be obtained from the current NAL unit.

The decoded picture buffer may comprise pictures decoded before, in decoding order, the current picture.

The decoder 50 may further be configured to conclude non-compliance to HEVC.

The decoder of FIG. 11 with its including units could be implemented in hardware. There are numerous variants of circuitry elements that can be used and combined to achieve the functions of the units of the decoder. Such variants are encompassed by the embodiments. Particular examples of hardware implementation of the decoder are implementation in digital signal processor (DSP) hardware and integrated circuit technology, including both general-purpose electronic circuitry and application-specific circuitry.

The decoder 50 described herein could alternatively be implemented e.g. by one or more of a processor 52, processing circuit, and adequate software with suitable storage or memory 54 therefore, a programmable logic device (PLD) or other electronic component(s) as shown in FIG. 11. In addition, the decoder 50 preferably comprises an input or input unit 51 configured to receive the encoded representations of pictures, such as in the form of NAL (Network Abstraction Layer) units. A corresponding output or output unit 53 is configured to output the decoded pictures.

Typically the reference picture buffer is an integrated part of the decoder 50. The memory 54 may contain the reference picture buffer plus other things needed for decoding.

FIG. 11 also illustrates a computer program 55 comprising computer readable code units which when executed on the decoder 50 causes the decoder 50 to perform the method as illustrated in FIGS. 3 and 9.

Finally, FIG. 11 shows a computer program product 56, comprising computer readable medium 57 and a computer program 55 as described directly above stored on the computer readable medium 57.

The computer readable medium may be a memory, a Universal Serial Bus (USB) memory, a DVD-disc, a Blu-ray disc, a software module that is received as a stream of data, a Flash memory, a hard drive etc.

Figure 12:
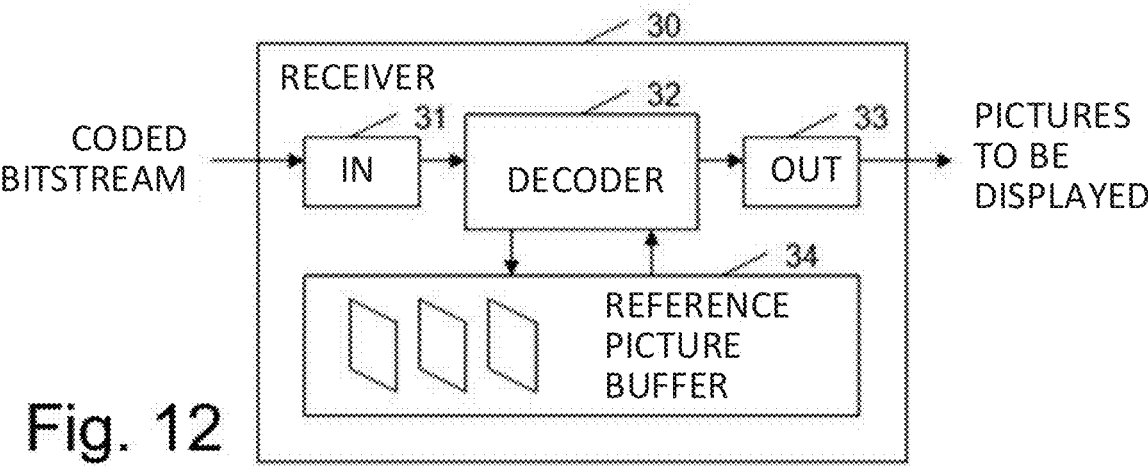
FIG. 12 is a further block diagram illustrating embodiments of the decoder.

Now referring to FIG. 12, a decoder 32 according to embodiments herein can, for example, be located in a receiver 30, such as in a video camera, set-top-box or a display, e.g. in a mobile device. The receiver 30 then comprises an input or input unit 31 configured to receive a coded bitstream, such as data packets of NAL units. The encoded representations of the NAL units are decoded by the decoder 32 as disclosed herein. The decoder 32 preferably comprises or is connected to a reference picture buffer 34 that temporarily stores already decoded pictures that are to be used as reference pictures for other pictures in the video stream. Pictures in a reference picture set may be stored in the reference picture buffer. Decoded pictures are output from the receiver 30, such as from the reference picture buffer 34, by means of an output or output unit 33. These output pictures are sent to be displayed to a user on a screen or display of or connected, including wirelessly connected, to the receiver 30. The output pictures may also be stored on disk or transcoded without display.

The embodiments are not limited to HEVC but may be applied to any extension of HEVC such as a scalable extension or multi-view extension or to a different video codec. The embodiments are applicable to 2D and 3D video.

It is to be understood that the choice of interacting units or modules, as well as the naming of the units are only for exemplary purpose, and may be configured in a plurality of alternative ways in order to be able to execute the disclosed process actions.

It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

As used herein, the term "set" when used in conjunction with e.g. a flag may mean that a value of one is assigned to the flag.

As used herein, the term "clear" when used in conjunction with e.g. a flag may mean that a value of zero is assigned to the flag.

The invention claimed is:

1. A method for decoding a bitstream to obtain a video sequence, comprising:
obtaining, from the bitstream, least significant bits of a picture order count for a long term reference picture included in a reference picture set of the current picture; and
obtaining a flag for said long term reference picture, wherein the flag indicates whether or not to use a picture order count cycle;
wherein the flag indicates that the picture order count cycle is used when the least significant bits of a picture order count for the long term reference picture match more than one picture in a set of previously decoded pictures, wherein the set of previously decoded pictures comprises a previous temporal sub-layer reference picture (P) in decoding order that has a temporal identifier (TemporalId) equal to 0; and
wherein each picture of the bitstream comprises at least one network abstraction layer (NAL) unit, wherein each picture is decoded from a slice comprised in said at least one NAL unit.

2. The method according to claim 1, wherein the set of previously decoded pictures further comprises all pictures in a reference picture set of the temporal sub-layer reference picture P.

3. The method according to claim 1, wherein the set of previously decoded pictures further comprises all pictures that follow the temporal sub-layer reference picture P in decoding order and that precede the current picture in decoding order.

4. The method according to claim 1, wherein the previous temporal sub-layer reference picture P in decoding order that has TemporalId equal to 0 is not a random access skipped leading (RASL) picture, a random access decodable leading (RADL) picture, or a sub-layer non-reference picture.

5. The method according to claim 1, wherein the picture order count indicates order in which pictures of the video sequence are to be output.

6. The method according to claim 1, wherein the slice comprises a slice header and the slice header comprises the flag, the method further comprising:
decoding the current picture of the video sequence from a current slice, having a current slice header, and decoding the current slice from a current NAL unit.

7. The method according to claim 6, wherein the least significant bits are obtained from the current NAL unit.

8. The method according to claim 6, wherein the set of previously decoded pictures is provided in a decoded picture buffer that includes pictures decoded before, in decoding order, the current picture.

9. A decoder configured to decode a video sequence from a bitstream, wherein the decoder comprises:
at least one processor; and
a memory coupled to the at least one processor and storing computer readable program code that is executable by the at least one processor to perform, when decoding a current picture of the video sequence:
obtaining, from the bitstream, least significant bits of a picture order count for a long term reference picture included in a reference picture set of the current picture; and
obtaining a flag for said long term reference picture, wherein the flag indicates whether or not to use a picture order count cycle;
wherein the flag indicates that the picture order count cycle is used when the least significant bits of a picture order count for the long term reference picture match more than one picture in a set of previously decoded pictures, wherein the set of previously decoded pictures comprises a previous temporal sub-layer reference picture (P) in decoding order that has a temporal identifier (TemporalId) equal to 0; and
wherein each picture of the bitstream comprises at least one network abstraction layer (NAL) unit, wherein each picture is decoded from a slice comprised in said at least one NAL unit.

10. The decoder according to claim 9, wherein the set of previously decoded pictures further comprises all pictures in a reference picture set of the temporal sub-layer reference picture P.

11. The decoder according to claim 9, wherein the set of previously decoded pictures further comprises all pictures that follow the temporal sub-layer reference picture P in decoding order and that precede the current picture in decoding order.

12. The decoder according to claim 9, wherein the previous temporal sub-layer reference picture P in decoding order that has TemporalId equal to 0 is not a random access skipped leading (RASL) picture, a random access decodable leading (RADL) picture, or a sub-layer non-reference picture.

13. The decoder according to claim 9, wherein the picture order count indicates order in which pictures of the video sequence are to be output.

14. The decoder according to claim 9, wherein the slice comprises a slice header, and wherein the slice header comprises the flag, wherein the at least one processor further performs:

decoding the current picture of the video sequence from a current slice, having a current slice header, and decoding the current slice from a current NAL unit.

15. The decoder according to claim 14, wherein the least significant bits are obtained from the current NAL unit.

16. The decoder according to claim 14, wherein the set of previously decoded pictures is provided in a decoded picture buffer that includes pictures decoded before, in decoding order, the current picture.

* * * * *